US006487645B1

(12) United States Patent
Clark et al.

(10) Patent No.: US 6,487,645 B1
(45) Date of Patent: Nov. 26, 2002

(54) DATA STORAGE SUBSYSTEM WITH FAIRNESS-DRIVEN UPDATE BLOCKING

(75) Inventors: Brian Dow Clark, Tucson, AZ (US); William Frank Micka, Tucson, AZ (US); Warren Keith Stanley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/519,080

(22) Filed: Mar. 6, 2000

(51) Int. Cl.[7] .............................................. G06F 12/00
(52) U.S. Cl. ..................... 711/162; 711/161; 711/163; 711/156; 710/52; 710/57; 714/6; 707/204
(58) Field of Search ................................ 711/161, 162, 711/144, 145, 156, 163; 714/6; 707/204; 710/52, 57

(56) References Cited

U.S. PATENT DOCUMENTS

| 5,241,669 | A | | 8/1993 | Cohn et al. .................. 395/575 |
| 5,241,670 | A | * | 8/1993 | Eastridge et al. .............. 714/1 |
| 5,375,232 | A | * | 12/1994 | Legvold et al. .............. 711/162 |
| 5,504,861 | A | | 4/1996 | Crockett et al. ....... 395/182.11 |
| 5,592,618 | A | * | 1/1997 | Micka et al. .................. 714/54 |
| 5,742,792 | A | | 4/1998 | Yanai et al. ................. 395/489 |
| 5,875,479 | A | * | 2/1999 | Blount et al. ................. 711/162 |
| 5,909,700 | A | * | 6/1999 | Bitner et al. ................. 711/162 |
| 6,148,382 | A | * | 11/2000 | Bitner et al. ................. 711/162 |
| 6,148,383 | A | * | 11/2000 | Micka et al. ................. 711/162 |
| 6,202,135 | B1 | * | 3/2001 | Kedem et al. ............... 711/162 |
| 6,226,759 | B1 | * | 5/2001 | Miller et al. ..................... 714/6 |
| 6,237,008 | B1 | * | 5/2001 | Beal et al. .................. 707/204 |
| 6,260,129 | B1 | * | 7/2001 | Crockett et al. ............ 711/170 |

FOREIGN PATENT DOCUMENTS

JP          62-63348         9/1985

OTHER PUBLICATIONS

IBM Technical Disclosure Bulletin, vol. 39, No. 10, Oct. 1996.
IBM Technical Disclosure Bulletin, vol. 37, No. 02A, Feb. 1994.

* cited by examiner

Primary Examiner—Do Hyun Yoo
Assistant Examiner—Jasmine Song
(74) Attorney, Agent, or Firm—Dan Hubert & Assoc.

(57) ABSTRACT

When a primary data storage subsystem receives updates for local storage and mirroring at a counterpart secondary storage subsystem, the primary subsystem institutes device-specific, fairness-driven update blocking to avoid overrunning the primary subsystem's update buffer with updates destined for any one device. Broadly, the primary subsystem first receives update requests, then logs the updates in an update buffer, then stores the logged updates in primary storage, and finally copies the updates to the secondary storage subsystem. Each update request includes update data and also identifies a targeted logical device, physical device, or other subpart of primary storage. The primary subsystem maintains a counter or other update activity indicator that represents update activity for each storage subpart, such as the number of updates stored in the buffer. For each update request, the primary subsystem determines whether target subpart's update activity exceeds a prescribed level. If not, the update data is stored in primary storage. Otherwise, if the update activity is excessive, the primary subsystem rejects the update. Optionally, the primary subsystem may selectively override certain rejections to prevent completely blocking updates for that subpart.

32 Claims, 5 Drawing Sheets

DATA STORAGE SUBSYSTEM WITH FAIRNESS-DRIVEN UPDATE BLOCKING

BACKGROUND OF THE INVENTION

1. Field of the Invention

The present invention relates to data storage systems that utilize redundant data backup subsystems. More particularly, the invention concerns a method and apparatus employing a fairness approach to selectively allow or reject updates to a data storage subsystem, in order to avoid overrunning the data storage subsystem's update buffer.

2. Description of the Related Art

In this information age, there is more data than ever to transmit, receive, process, and store. And, as people's reliance upon machine readable data increases, they are more vulnerable to damage caused by data loss. Consequently, data backup systems have never been more important.

Generally, data backup systems copy a designated group of source data, such as a file, volume, storage device, partition, etc. If the source data is lost, applications can use the backup copy instead of the original, source data. The similarity between the backup copy and the source data may vary, depending upon how often the backup copy is updated to match the source data. If the backup copy is updated in step with the source data, the copy is said to be a "mirror" of the source data, and is always "consistent" with the source data.

Some competing concerns in data backup systems are cost, speed, and data consistency. Systems that guarantee data consistency often cost more, and operate more slowly. On the other hand, many faster backup systems typically cost less while sacrificing absolute consistency.

One example of a data backup system is the Extended Remote Copy ("XRC") system, sold by International Business Machines Corp ("IBM"). In addition to the usual primary and secondary storage devices, the XRC system uses a "data mover" machine coupled between primary and secondary devices. The data mover performs backup operations by copying data from the primary devices to the secondary devices. Storage operations in the XRC system are "asynchronous," since primary storage operations are committed to primary storage without regard for whether the corresponding data has been stored in secondary storage.

The secondary devices are guaranteed to be consistent with the state of the primary devices at some specific time in the past. This is because the XRC system time stamps data updates stored in the primary devices, enabling the secondary devices to implement the updates in the same order. Time stamping in the XRC system is done with a timer that is shared among all hosts coupled to primary storage. As an example, the common timer may comprise an IBM Sysplex Timer, PIN 9037-002. Since the secondary devices are always consistent with a past state of the primary devices, a limited amount of data is lost if the primary devices fail.

A different data backup system is IBM's Peer-to-Peer Remote Copy ("PPRC") system. The PPRC approach does not use a data mover machine. Instead, storage controllers of primary storage devices are coupled to controllers of counterpart secondary devices by suitable communications links, such as fiber optic cables. The primary storage devices send updates to their corresponding secondary controllers. With PPRC, a data storage operation does not succeed until updates to both primary and secondary devices complete. In contrast to the asynchronous XRC system, PPRC performs "synchronous" backups.

In many backup systems, recovery involves a common sequence of operations. First, backup data is used to restore user data to a known state, as of a known date and time. Next, "updates" to the primary subsystem that have not been transferred to the secondary subsystem are copied from the "log" where they are stored at the primary subsystem, and applied to the restored data. The logged updates represent data received after the last backup was made to the secondary subsystem, and are usually stored in the same chronological order according to when they were received by the primary subsystem. After applying the logged updates, the data is considered to be restored, and the user's application program is permitted to access the restored data.

Although many of the foregoing technologies constitute significant advances, and may even enjoy significant commercial success today, IBM engineers are continually seeking to improve the performance and efficiency of today's data backup systems. One area of possible focus concerns the management of updates received at the primary storage devices. Namely, in some cases, an excessive number of updates are received before there is an opportunity to transfer updates to the secondary subsystem, and clear the log. In this case, these updates can overrun the update log, possibly causing the backup session to fail.

One possible solution to this problem is to limit the number of updates placed into the update log by uniformly blocking all updates intended for certain storage devices. For instance, the primary subsystem may block updates intended for all devices in a particular channel group. However, as recognized by the present inventors, this approach may result in blocking a relatively small number of updates for some devices that unfortunately happen to reside in the blocked channel group. Thus, the effect of this solution is unfairly applied to the devices in that channel group. These devices are "starved" from receiving updates, which may cause delays in the application programs trying to store data on those devices. Although the effect of these delays varies by the nature of the application program, they range from user frustration to possible program crashes. Consequently, known update management approaches may not be completely adequate for some applications due to certain unsolved problems.

SUMMARY OF THE INVENTION

When a primary data storage subsystem receives updates for local storage and backup at a counterpart secondary storage subsystem, the primary subsystem institutes device-specific, fairness-driven update blocking to avoid overrunning the primary subsystem's update buffer with updates destined for any one physical or logical device. Broadly, the primary subsystem initially receives update requests, logs the updates in an update buffer, stores the logged updates in primary storage, and finally copies the updates to the secondary storage subsystem. Each update request includes update data and also identifies a corresponding logical device, physical device, or other targeted subpart of primary storage. The primary subsystem maintains a counter or other "update activity indicator" that represents update activity for each storage subpart. The update activity may comprise, for example, the number or size of updates contained in the buffer for that subpart. For each update request, the primary subsystem consults the update activity indicator to determine whether the identified subpart's update activity exceeds a prescribed level. If not, the update data is stored in primary storage. Otherwise, if the update activity is excessive, the primary subsystem rejects the update. Optionally, the primary subsystem may selectively override certain rejections to prevent starving updates for that subpart.

The foregoing features may be implemented in a number of different forms. For example, the invention may be implemented to provide a method to apply fairness-driven update blocking to avoid overrunning the primary subsystem's update buffer with updates destined for any one physical device, logical device or other storage subpart. In another embodiment, the invention may be implemented to provide an apparatus such as a data storage subsystem, configured to apply fairness-driven update blocking as explained herein. In still another embodiment, the invention may be implemented to provide a signal-bearing medium tangibly embodying a program of machine-readable instructions executable by a digital data processing apparatus to perform operations as discussed above. Another embodiment concerns logic circuitry having multiple interconnected electrically conductive elements configured to perform operations as discussed above.

The invention affords its users with a number of distinct advantages. Chiefly, the invention implements fairness-driven update blocking to regulate additions to the update buffer without starving devices that are not receiving updates at an excessive rate. With this technique, only the devices that have exceeded prescribed thresholds are blocked, allowing other applications to run properly. Advantageously, the invention also provides for reviewing and then dynamically tuning the blocking methodology. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections
Introduction

Figure 1:
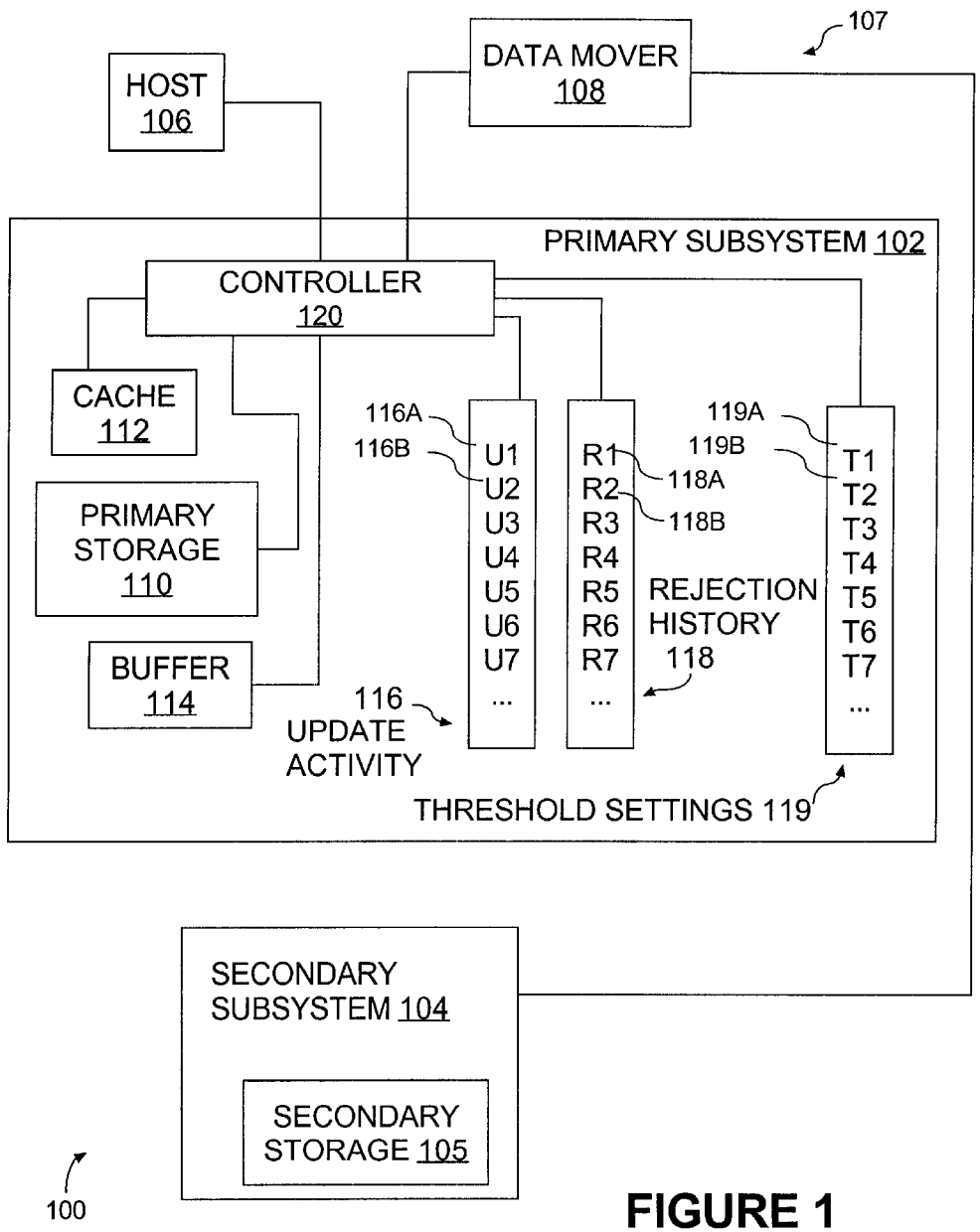
FIG. 1 is a block diagram of the hardware components and interconnections of a data storage system according to the invention.

One aspect of the invention concerns a data storage system, which may be embodied by various hardware components and interconnections, with one example being illustrated by the system 100 (FIG. 1). The system 100 includes a primary data storage subsystem 102 and a secondary data storage subsystem 104. The primary subsystem 102 is coupled to one or more hosts, as illustrated by the host 106. The subsystems 102, 104 are interconnected by a link 107 for use in copying updates from the primary subsystem 102 to the secondary subsystem 104. The link 107 implements an extended remote copy link, because it utilizes the data mover 108 to asynchronously transfer updates from primary to secondary. Although the data mover 108 is shown between the subsystems 102, 104 for ease of illustration, the data mover 108 may be built-in to the primary subsystem 102, or the secondary subsystem 104. The data mover 108 may be implemented by the commercially available IBM S/390 machine running IBM XRC software, for example.

As illustrated, the primary subsystem 102 is coupled to a host 106, which comprises one or more personal computers, mainframe computers, computer workstations, computer networks, manually operated data input devices, modem, scanner, or other source of update data. Broadly, the host 106 sends update data to the primary subsystem 102 for storage therein. For ease of reference, "update" data is used to include data that is new to the subsystem 102, additions to existing data stored on the subsystem 102, changes to existing data, deletions, etc. Initially, the primary subsystem 102 temporarily buffers update data. Later, the subsystem 102 "commits" buffered data by copying it into various local, nonvolatile storage devices. Ultimately, the data mover 108 retrieves buffered data that has been committed and copies it to counterpart storage devices in the secondary subsystem 104. At this point, the primary subsystem 102 can delete the update data from its buffer.

The present invention also contemplates a number of other data storage arrangements, which should be apparent to those of ordinary skill in the art with the benefit of this disclosure As an example, a data mover may be attached to multiple primary subsystems and multiple secondary subsystems as well. In this arrangement, each primary subsystem may be coupled to one or more hosts, where these hosts may (or may not) be attached to other primary subsystems.

Primary Subsystem

As illustrated, the primary subsystem 102 includes a controller 120, primary storage 110, cache 112, buffer 114, update activity indicator 116, rejection history indicator 118, and threshold setting indicator 119. Although the controller 120 and primary storage 110 are implemented by hardware, the cache, buffer, and indicators may be implemented by software, hardware, or a combination of both.

One example of the primary subsystem 102 comprises an IBM model 3990 product, or another suitable computing machine. The controller 120 may be implemented by one or more microprocessors, processing node, microcontrollers, programmable logic, discrete circuit components, or other configuration that is suitable to the illustrated application. In the illustrated embodiment, the primary storage 110 comprises magnetic disk drive storage. Still, other types of nonvolatile storage may be utilized, such as circuit memory with battery backup, magnetic tape, optical tape, optical disk, etc.

The primary storage 110 includes multiple subparts, which are referred to as "devices." Each device may comprise some or all of one physical or logical device, multiple logical or physical devices, parts of multiple physical or logical devices, or combinations of these. In the illustrated embodiment, the subparts of the primary storage 110 comprise logical devices.

The cache 112 and buffer 114 comprise temporary storage facilities, which may be implemented in the primary storage 110, or by separate storage facilities as illustrated. As an example, the buffer 114 may comprise nonvolatile storage, to protect the integrity of buffered data updates. Buffered updates may also be referred to as "sidefiles." Buffer contents may also be stored in the form of a journal that is provided at the data mover 108.

The update activity indicator 116 includes a separate update counter (e.g., 116a, 116b) corresponding to each logical device of the primary storage 110. For example, the update counter 116a is incremented each time the buffer 114 receives an update for a logical device corresponding to that counter 116a. Conversely, the update counter 116a is decremented each time the data mover 108 transfers, and the buffer purges, an update designating the counter's logical device. This is explained in greater detail below.

Similarly, the rejection history indicator 118 includes a separate counter (e.g., 118a, 118b) corresponding to each logical device of the primary storage 110. As an example, the rejection counter 118a is incremented each time the controller 120 rejects an update that was intended for a logical device corresponding to that counter 118a, as discussed in greater detail below.

The threshold setting indicator 119 includes a separate setting (e.g. 119a, 119b) for each logical device of the primary storage 110. Each setting contains the value of an "update threshold," after which update activity for the corresponding logical device may be curtailed.

Secondary Subsystem

The secondary system 104 includes a secondary storage 105 with storage devices corresponding to those in the primary subsystem 102. This enables the secondary subsystem 104 to duplicate the primary subsystem 102. The secondary subsystem 104 also includes other components (not shown) appropriate to operate the secondary storage 105. As one example, the primary subsystem 102 may be implemented by an IBM model 3990 product, or another suitable computing machine.

Exemplary Digital Data Processing Apparatus

As mentioned above, the primary subsystem's controller 120 may be implemented in different forms, including a microprocessor or other digital data processing apparatus. This apparatus may be embodied by various hardware components and interconnections; one example is the digital data processing apparatus 200 of FIG. 2A. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, a different embodiment of the invention uses logic circuitry instead of computer-executed instructions to implement the controller 120. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

In addition to the various hardware embodiments described above, a different aspect of the invention concerns a method of device-specific, fairness-driven update blocking to avoid overrunning the primary subsystem's update buffer with updates destined for any one physical or logical device.

Signal-Bearing Media

Figure 2A:
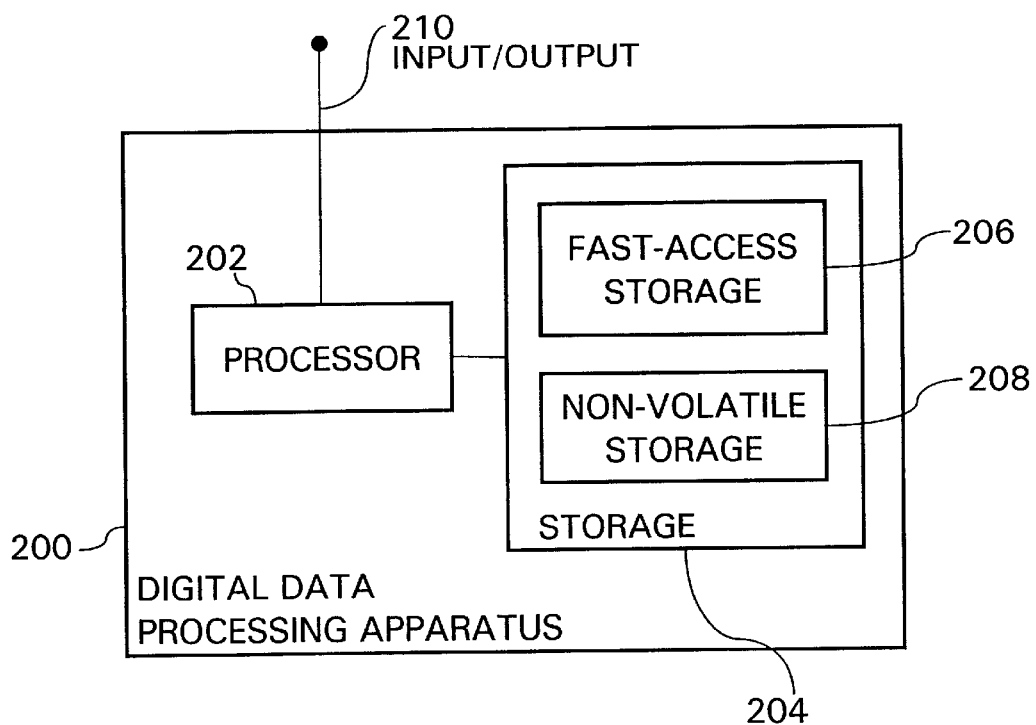
FIG. 2A s a block diagram of a digital data processing machine according to the invention.
Figure 2B:
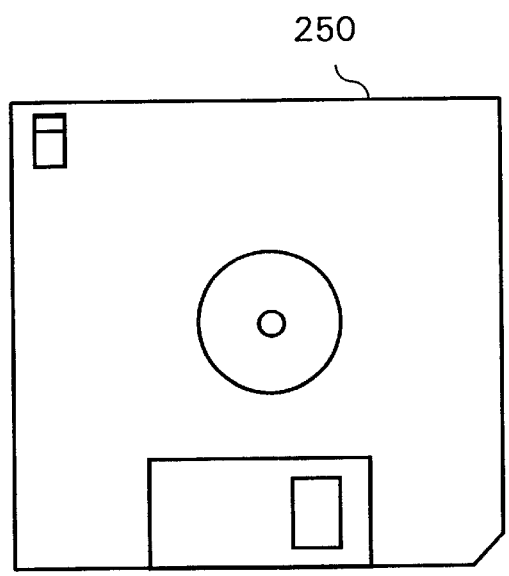
FIG. 2B shows an exemplary signal-bearing medium according to the invention.

In the context of FIGS. 1–2A, such a method may be implemented, for example, by operating the controller 120, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method of device-specific, fairness-driven update blocking to avoid overrunning the primary subsystem's update buffer with updates destined for any one physical or logical device.

This signal-bearing media may comprise, for example, RAM (not shown) contained within the primary subsystem 102, as represented by the fast-access storage 206. Alternatively, the instructions may be contained in another signal-bearing media, such as a magnetic data storage diskette 250 (FIG. 2A), directly or indirectly accessible by the processor 202. Whether contained in the storage 206, diskette 250, or elsewhere, the instructions may be stored on a variety of machine-readable data storage media, such as direct access storage (e.g., a conventional "hard drive," redundant array of inexpensive disks ("RAID"), or another direct access storage device ("DASD")), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the controller 120, and is configured to perform operations to implement the method of the invention. The logic circuitry may be implemented using many different types of circuitry, as discussed above.

Update Processing

Figure 3:
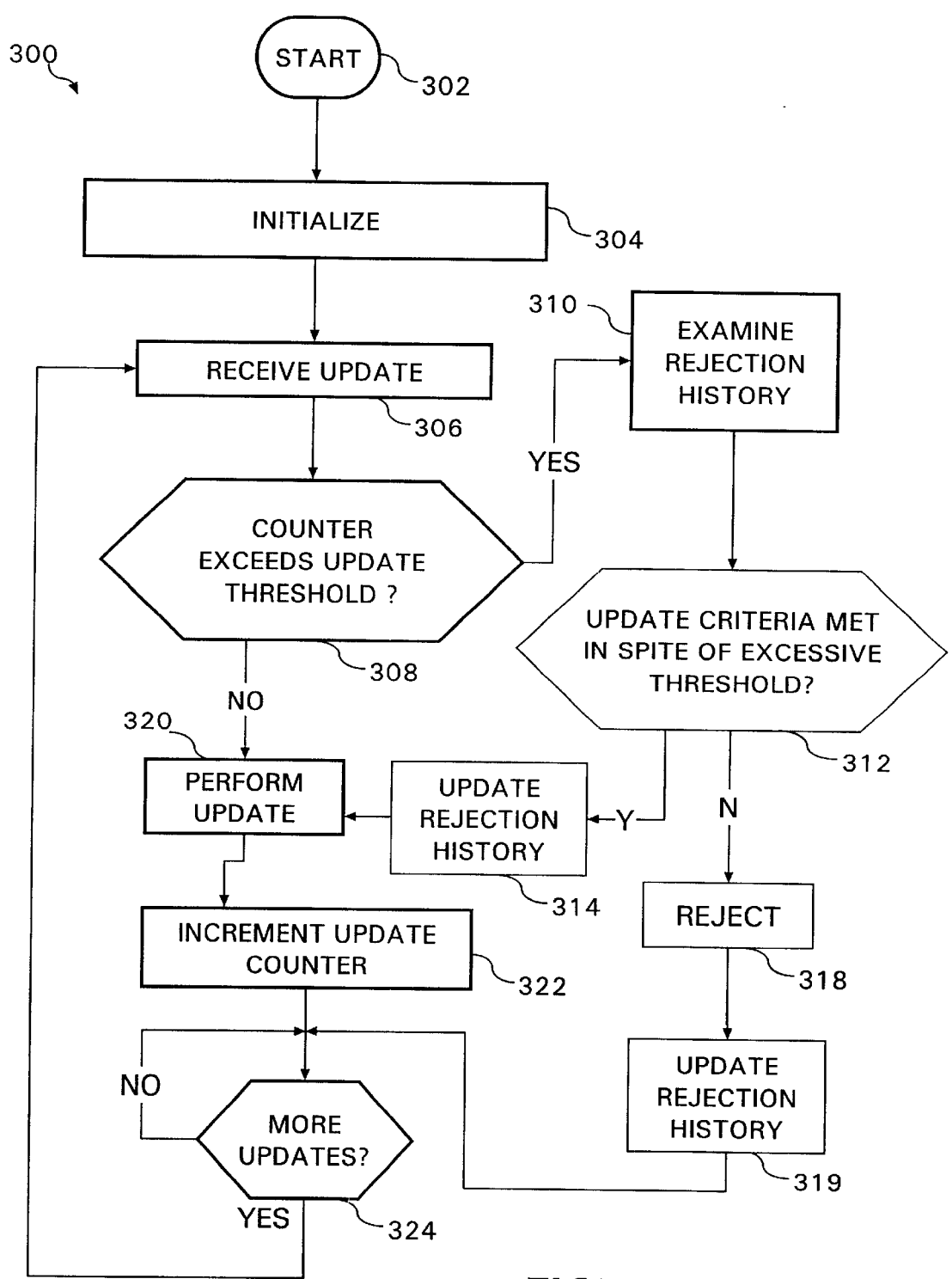
FIG. 3 is a flowchart of an operational sequence for processing updates according to the invention.

FIG. 3 shows a sequence 300 for processing update requests, according to the method aspect of the present invention. For ease of explanation, but without any intended limitation, the example of FIG. 3 is described in the context of the system 100 described above. In this setting, the sequence 300 is performed by the controller 120. The sequence 300 is initiated (step 302), for example, when the primary subsystem 102 receives power, is re-initialized, or otherwise "boots up." In step 304, the controller 120 forms an initialization operation by assessing the state of the subsystem components, performing various diagnostic checks, etc. In step 306 the controller 120 receives an update request from the host 106. Each update request includes (1) update data and (2) designation of a target logical device in primary storage 110, where the host 106 desires to have the update data stored. The update of step 306 is referred to as the "current" update. Likewise, the logical device specified in step 306 is referred to as the "currents" or "target" logical device.

In one example, each update may comprise a prescribed size of data, such as one "track." In this example, the update activity indicator 16 may comprise a number of binary counters, since the amount of buffer occupation is proportional to the number of updates. In a different embodiment, such as where the updates vary in size, the update counters may comprise digital representations of the amount of update data that has been buffered for a particular logical device. For ease of illustration, the present discussion utilizes the example of binary counters and equal-size items of update data.

After step 306, the controller 120 in step 308 consults the update activity indicator 116 to determine whether the counter (e.g., 116a, 116b) corresponding to the current logical device has exceeded the corresponding "update threshold" as shown in the threshold setting indicator 119. For each logical device in primary storage 110, the corresponding update counter tells how many updates are contained in the buffer 114. As one example, all threshold settings (e.g. 119a, 119b) in the threshold setting indicator 119 may be set to the same number, such as five, to make the buffer equally available to store updates for all logical devices. The determination and adjustment of the threshold settings 119 is discussed in greater detail below.

If the counter has not exceeded its threshold, step 308 advances to step 320, where the controller 120 stores the update data in the buffer 114. The controller 120 stores the update data in a manner that conveys the identity of the current logical device. For example, the controller 120 may store the update data along with a code representing the current logical device. As a different example, the buffer 114 may include separate tables, lists, or regions corresponding to each logical device, where the controller 120 stores each item of update data in the area corresponding to the appropriate logical device. Following step 320, the controller 120 increments the current logic device's counter 116 (step 322), then checks for the arrival of more updates (step 324).

In contrast to the foregoing description, if the controller 120 finds that the counter 116 has exceeded its threshold setting 119 (step 308), this indicates an excessive number of updates for the current logical device. If unchecked, this may cause the buffer 114 to fill with updates for the current logical device. Therefore, as a general rule, the current update should be rejected. And, in one embodiment, step 308 may proceed directly to step 318, where the controller 120 returns a message to the host rejecting the current update.

In a different embodiment, as illustrated in FIG. 3, the controller 120 proceeds from step 308 to consider the rejection history 118 for the current logical device (step 310), and possibly permit buffering of a "freebie" update in spite of the excessive threshold to prevent "starving" of the application that is storing so many updates upon the current logical device. Generally, the controller 120 considers the current logical device's rejection history 118 (step 310) by reviewing the rejection counter (e.g., 118a, 118b . . . ) for the current logical device. As one example, each rejection counter may comprise a binary counter. In step 312, the controller 120 determines whether the current logical device's rejection history 118 meets certain "rejection exception criteria to justify for a "freebie" update. If so, the controller 120 advances to step 314, where the rejection history is updated to reflect that a "freebie" was permitted. Step 314 then proceeds to store the current update data in the buffer 114, (step 320). The criteria of step 312 is selected to selectively permit a prescribed level of otherwise excessive updates. For example, the controller 120 may allow half of the excessive updates by accepting otherwise excessive updates when the rejection counter is even rejecting updates when the rejection counter is odd. Similarly, every third excessive update may be permitted by allowing updates when the rejection counter is divisible by three, etc.

On the other hand, if the controller 120 in step 312 finds that the current logical device's rejection history does not meet the prescribed criteria for an update "freebie," the controller 120 rejects the current update request in step 318. This may be achieved, for example, by returning an appropriate rejection message to the host 106. Depending upon programming of the host 106, the host may re-attempt the update later. After the rejection (step 318), the controller 120 advances the rejection history 118 in step 319, and then returns to step 324, which is discussed above.

Data Transfer

Figure 4:
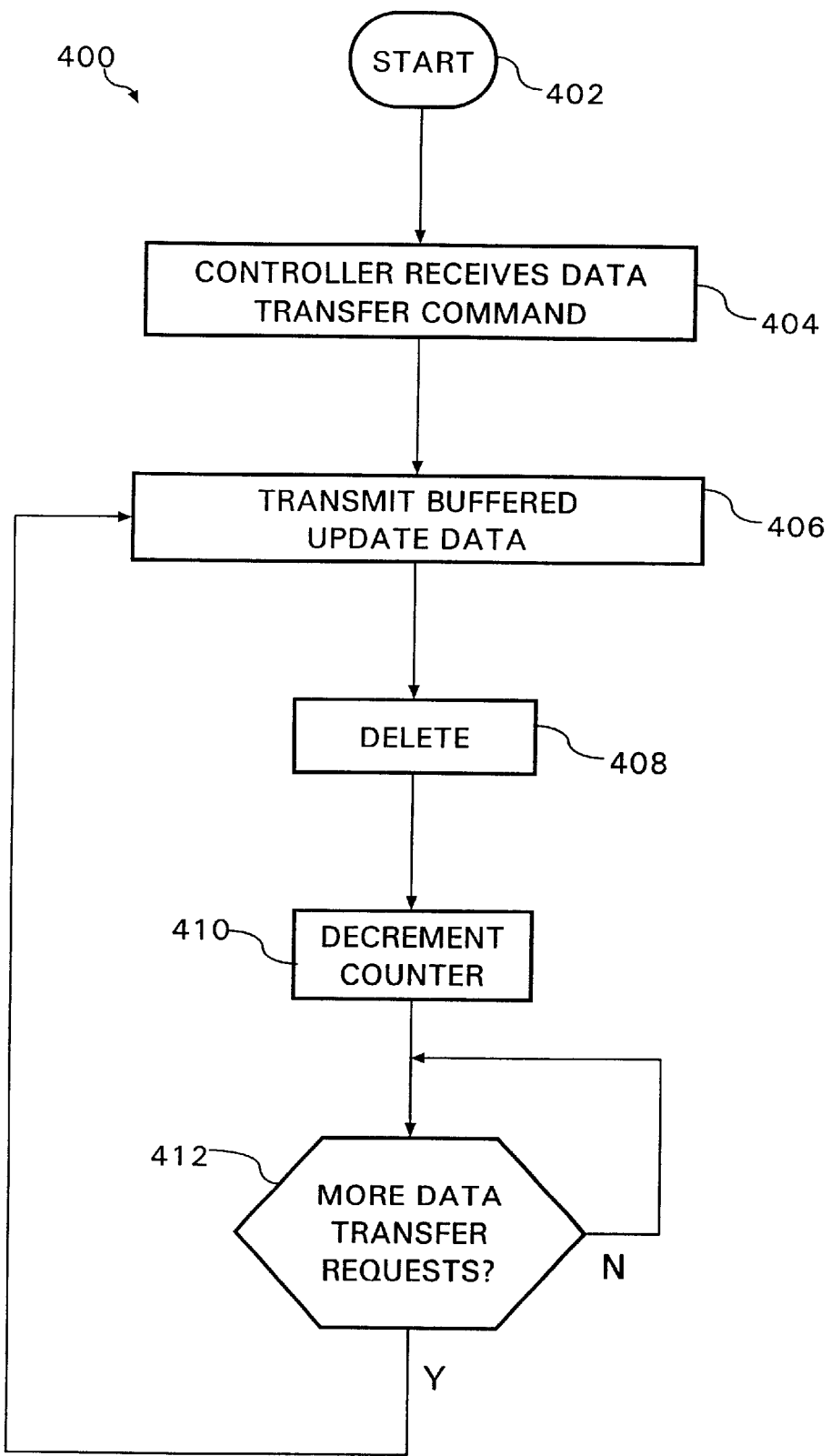
FIG. 4 is a flowchart of an operational sequence for transferring data from primary to secondary subsystems according to the invention.

FIG. 4 shows a sequence 400 for copying contents of the buffer 114 over to secondary subsystem 104. For ease of explanation, but without any intended limitation, the example of FIG. 4 is described in the context of the system 100 described above. In this setting, the sequence 400 is performed by the controller 120.

After the sequence 400 is initiated (step 402), the controller 120 receives a data transfer command from the data mover 108 (step 404). The data transfer command directs the controller 120 to transmit some or all of the buffered update data to the data mover 108 for storage on the secondary subsystem 104. In response, the controller 120 transmits the requested update data from the buffer 114 to the data mover 108 (step 406). The controller 120 also transfers data identifying the corresponding logical device of each item of update data. After the update data is successfully transferred to the data mover 108, or at the time data is committed or another later time if appropriate, the controller 120 deletes the update data from the buffer 114 (step 408).

After step 408, the controller decrements each update counter 116 once for each related item of update data that was transferred to the data mover 108 and consequently removed from the buffer 114 (step 410). In the presently illustrated example, each update counter 116 represents the number of buffered updates for a particular logical device, since the update counter is incremented when an update is buffered and decremented when the update is transferred to the secondary subsystem 104. After step 410, the controller 120 determines whether there are any more pending data transfer commands from the data mover 108 (step 412), and if so, returns to step 406.

Adjusting Update Parameters

Figure 5:
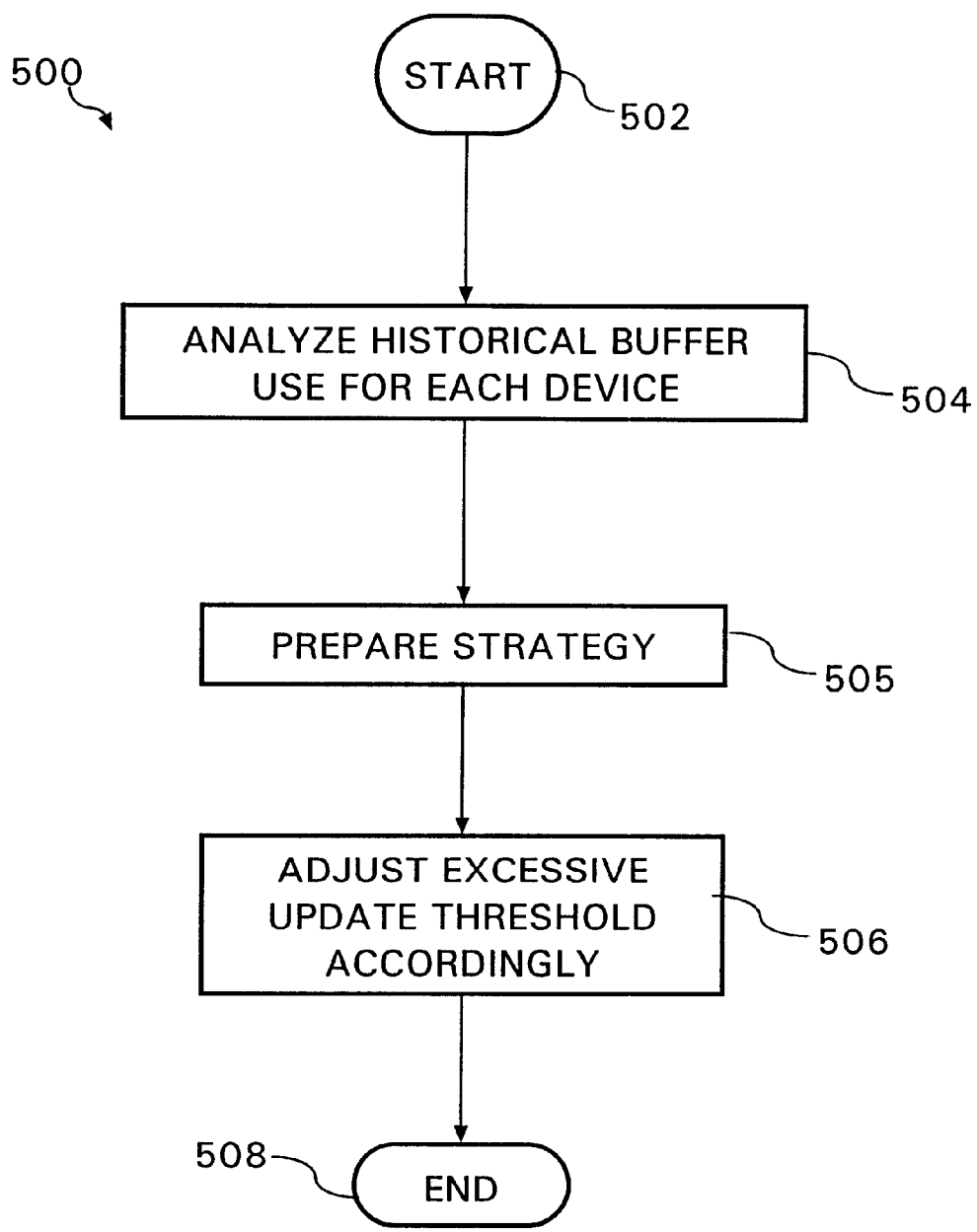
FIG. 5 is a flowchart of an operational sequence for dynamically adjusting update parameters according to the invention.

FIG. 5 shows a sequence 500 for adjusting the setting 119 threshold (utilized in step 308) and rejection exception criteria (utilized in step 312). For ease of explanation, but without any intended limitation, the example of FIG. 5 is described in the context of the system 100 described above. In this setting, the sequence 500 is performed by the controller 120. The sequence 500 may be initiated (step 502) at various times, depending upon the needs of the application. For example, the sequence 500 may be initiated periodically (e.g., once every minute), after an update is buffered (step 320), whenever buffered update data is transferred to the data mover 108 (step 406), whenever the buffer 114 becomes full before any thresholds 119 are met, or another appropriate time.

After step 502, the controller 120 analyzes the historical buffer activity for each logical device (step 504). The controller 120 may consider, for example, the update counters 116, the rejection history 118, the overall fullness or emptiness of the buffer 114, the individual excessive update threshold setting 119, and the interrelationship of these factors.

After step 504, the controller 120 in step 506 prepares a strategy to adjust some or all of the update threshold settings 119 (step 505). For example, the controller 120 may decrease a logical device's threshold if this device historically experiences a disproportionately large number of updates, thus preventing the device from overfilling the buffer 114. As another consideration, the sum of all devices' thresholds may be set to equal (or slightly exceed) the buffer 114 size. Step 505 may also include other considerations, such as the fact that update activity to a logical device can change over time, thereby requiring an adjustment of the threshold setting. Still other considerations may include the rate of off-load updates, the number of updates to the exact same record, the number of data busy events indicating simultaneous access by the host 106 and data mover 108, etc. Also, the threshold may be set as a percentage of the buffer's size, instead of a count of allowed updates.

In the alternative embodiment, the sequence 500 may be performed by the data mover 108 instead of the controller 120. In this embodiment, the data mover 108 sends commands to the controller 120 to read the update counters 116 (step 504) and establish new threshold settings 119 (step 506). Relatedly, if the data mover 108 contains buffer storage space that may potentially be overrun, the data mover 108 may lower the threshold settings to throttle the rate of data transfer through the data mover 108. After preparing this strategy (step 505), the controller 120 implements the prepared strategy by actually establishing new excessive update thresholds accordingly (step 506). After step 506, the routine 500 ends in step 508.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for managing updates received at a primary data storage subsystem for duplication at a counterpart secondary storage subsystem, the primary subsystem including an update buffer and a data storage of multiple subparts, the method comprising the operations of:

the primary subsystem receiving update requests from at least one host, each update request including update data and designation of a corresponding target primary storage subpart; and for each subpart, maintaining an update activity indicator representing update activity of that subpart;

repeatedly evaluating whether update activity for any subpart has exceeded a prescribed threshold; and for each received update request,
if the update activity indicator for the update request's target subpart has exceeded the threshold, selectively rejecting the update; and
if the update activity indicator for the update request's designated subpart has not exceeded the threshold, storing the update data in the update buffer.

2. The method of claim 1, where each subpart's update activity indicator comprises a count of update data items in the buffer for that subpart.

3. The method of claim 1, where each subpart's update activity indicator comprises a total size of update data items in the buffer for that subpart.

4. The method of claim 1, where:
the update activity indicators represent update data stored in the buffer.

5. The method of claim 1, the operation of selectively rejecting the update comprising:
evaluating a rejection history for the target subpart; and
storing the update data in the update buffer only if rejection history for the target subpart meets certain conditions.

6. The method of claim 1, the operations further comprising:
in response to the primary subsystem copying update data to the secondary subsystem and removing the update data from the buffer, reducing the update activity indicator of the corresponding target subparts.

7. A method for managing updates submitted by host applications for storage by a data storage system that includes a primary subsystem and a mirrored secondary subsystem, the primary subsystem including data storage containing multiple data items, the method comprising the operations of:

receiving update requests, each update request including update data and identification of an associated data item in the data storage to be updated by the update data;

for each received update request, consulting an update record to determine whether past update activity of the associated data item exceeds a prescribed level, and
if not, storing the update in an update buffer and advancing the update record;
if so, consulting a rejection record to determine whether past rejection of updates to the associated data item exceeds a predetermined level, and
if so, storing the update in the update buffer and advancing the update record;
if not, rejecting the update and advancing the rejection record.

8. A method of managing update activity in a data storage system that includes a primary subsystem and a secondary subsystem, the primary and secondary subsystems including respective primary and secondary storage devices, where the primary subsystem receives update requests from one or more hosts, each update request including update data and specification of one of the primary storage devices, and where responsive to each update request the primary subsystem initially buffers the update data in a primary subsystem sidefile and thereafter copies the buffered update data to the specified primary storage device and also to a counterpart secondary device, the method comprising the operations of:

tracking update activity according to specified primary storage device;

performing fairness-driven update regulation, comprising:

for update requests specifying primary storage devices with a prescribed level of update activity, preventing storage of these update requests in the sidefile; and for update requests specifying primary storage devices with less than the prescribed level of update activity, permitting these update requests to continue to fill the sidefile.

9. The method of claim 8, further comprising:

adjusting the prescribed levels in response to changes in workload characteristics of the primary storage devices.

10. A signal-bearing medium tangibly embodying a program of machine-readable instructions executable by a digital processing apparatus to perform a method for managing updates received at a primary data storage subsystem for duplication at a counterpart secondary storage subsystem, the primary subsystem including an update buffer and a data storage of multiple subparts, where the primary subsystem receives update requests from at least one host, each update request including update data and designation of a corresponding target primary storage subpart, the method comprising the operations of:

for each subpart, maintaining an update activity indicator representing update activity of that subpart;

repeatedly evaluating whether update activity for any subpart has exceeded a prescribed threshold; and for each received update request, if the update activity indicator for the update request's target subpart has exceeded the threshold, selectively rejecting the update; and if the update activity indicator for the update request's designated subpart has not exceeded the threshold, storing the update data in the update buffer.

11. The medium of claim 10, where each subpart's update activity indicator comprises a count of update data items in the buffer for that subpart.

12. The medium of claim 10, where each subpart's update activity indicator comprises a total size of update data items in the buffer for that subpart.

13. The medium of claim 10, where:

the update activity indicators represent update data stored in the buffer.

14. The medium of claim 10, the operation of selectively rejecting the update comprising:

evaluating a rejection history for the target subpart; and storing the update data in the update buffer only if rejection history for the target subpart meets certain conditions.

15. The medium of claim 10, the operations further comprising:

in response to the primary subsystem copying update data to the secondary subsystem and removing the update data from the buffer, reducing the update activity indicator of the corresponding target subparts.

16. A signal-bearing medium tangibly embodying a program of machine-readable instructions executable by a digital processing apparatus to perform operations for managing updates submitted by host applications for storage by a data storage system that includes a primary subsystem and a mirrored secondary subsystem, the primary subsystem including data storage containing multiple data items, the operations comprising:

receiving update requests, each update request including update data and identification of an associated data item in the data storage to be updated by the update data;

for each received update request, consulting an update record to determine whether past update activity of the associated data item exceeds a prescribed level, and if not, storing the update in an update buffer and advancing the update record;

if so, consulting a rejection record to determine whether past rejection of updates to the associated data item exceeds a predetermined level, and if so, storing the update in the update buffer and advancing the update record;

if not, rejecting the update and advancing the rejection record.

17. A signal-bearing medium tangibly embodying a program of machine-readable instructions executable by a digital processing apparatus to perform a method of managing update activity in a data storage system that includes a primary subsystem and a secondary subsystem, the primary and secondary subsystems including respective primary and secondary storage devices, where the primary subsystem receives update requests from one or more hosts, each update request including update data and specification of one of the primary storage devices, and where responsive to each update request the primary subsystem initially buffers the update data in a primary subsystem sidefile and thereafter copies the buffered update data to the specified primary storage device and also to a counterpart secondary device, the method comprising the operations of:

tracking update activity according to specified primary storage device;

performing fairness-driven update regulation, comprising:

for update requests specifying primary storage devices with a prescribed level of update activity, preventing storage of these update requests in the sidefile; and for update requests specifying primary storage devices with less than the prescribed level of update activity, permitting these update requests to continue to fill the sidefile.

18. The medium of claim 17, the operations further comprising:

adjusting the prescribed levels in response to changes in workload characteristics of the primary storage devices.

19. A logic circuit of multiple interconnected electrically conductive elements configured to perform operations for managing updates received at a primary data storage subsystem for duplication at a counterpart secondary storage subsystem, the primary subsystem including an update buffer and a data storage of multiple subparts, the method comprising the operations of:

the primary subsystem receiving update requests from at least one host, each update request including update data and designation of a corresponding target primary storage subpart; and for each subpart, maintaining an update activity indicator representing update activity of that subpart;

repeatedly evaluating whether update activity for any subpart has exceeded a prescribed threshold; and for each received update request, if the update activity indicator for the update request's target subpart has exceeded the threshold, selectively rejecting the update; and if the update activity indicator for the update request's designated subpart has not exceeded the threshold, storing the update data in the update buffer.

20. A logic circuit of multiple interconnected electrically conductive elements configured to perform operations for managing updates submitted by host applications for storage by a data storage system that includes a primary subsystem and a mirrored secondary subsystem, the primary subsystem including data storage containing multiple data items, the operations comprising:

receiving update requests, each update request including update data and identification of an associated data item in the data storage to be updated by the update data;

for each received update request, consulting an update record to determine whether past update activity of the associated data item exceeds a prescribed level, and if not, storing the update in an update buffer and advancing the update record;

if so, consulting a rejection record to determine whether past rejection of updates to the associated data item exceeds a predetermined level, and if so, storing the update in the update buffer and advancing the update record;

if not, rejecting the update and advancing the rejection record.

21. A logic circuit of multiple interconnected electrically conductive elements configured to perform operations for managing updates received at a primary data storage subsystem for managing update activity in a data storage system that includes a primary subsystem and a secondary subsystem, the primary and secondary subsystems including respective primary and secondary storage devices, where the primary subsystem receives update requests from one or more hosts, each update request including update data and specification of one of the primary storage devices, and where responsive to each update request the primary subsystem initially buffers the update data in a primary subsystem sidefile and thereafter copies the buffered update data to the specified primary storage device and also to a counterpart secondary device, the method comprising the operations of:

tracking update activity according to specified primary storage device;

performing fairness-driven update regulation, comprising:

for update requests specifying primary storage devices with a prescribed level of update activity, preventing storage of these update requests in the sidefile; and for update requests specifying primary storage devices with less than the prescribed level of update activity, permitting these update requests to continue to fill the sidefile.

22. A digital data storage subsystem, comprising:

a backup data storage subsystem;

a primary data storage subsystem coupled to the backup data storage subsystem and including a controller, an update buffer, and a data storage of multiple subparts, the controller being programmed to perform operations to manage updates received at the primary data storage subsystem for duplication at the secondary storage subsystem, the operations comprising:

the primary subsystem receiving update requests from at least one host, each update request including update data and designation of a corresponding target primary storage subpart; and for each subpart, maintaining an update activity indicator representing update activity of that subpart;

repeatedly evaluating whether update activity for any subpart has exceeded a prescribed threshold; and for each received update request, if the update activity indicator for the update request's target subpart has exceeded the threshold, selectively rejecting the update request; and if the update activity indicator for the update request's designated subpart has not exceeded the threshold, storing the update data in the update buffer.

23. A digital data storage subsystem, comprising:

a backup subsystem;

a primary subsystem coupled to the backup subsystem and programmed to perform operations to manage updates submitted by host applications for storage by the primary subsystem, the operations comprising:

the primary subsystem receiving update requests, each update request including update data and identification of an associated data item in the data storage to be updated by the update data;

for each received update request, consulting an update record to determine whether past update activity of the associated data item exceeds a prescribed level, and if not, storing the update in an update buffer and advancing the update record;

if so, consulting a rejection record to determine whether past rejection of updates to the associated data item exceeds a predetermined level, and if so, storing the update in the update buffer and advancing the update record;

if not, rejecting the update and advancing the rejection record.

24. A digital data storage system, comprising:

a backup data storage subsystem including backup storage devices;

a primary data storage subsystem coupled to the backup data storage subsystem and including a controller, an update buffer, a primary subsystem sidefile, and primary storage devices corresponding to the backup storage devices, the primary data storage subsystem being coupled to one or more hosts for receiving update requests each including update data and specification of one of the primary storage devices, the controller being programmed to perform operations to manage update activity in the data storage system, the operations comprising:

tracking update activity according to specified primary storage device;

performing fairness-driven update regulation, comprising:

for update requests specifying primary storage devices with a prescribed level of update activity, preventing storage of the associated update data in the sidefile; and for update requests specifying primary storage devices with less than the prescribed level of update activity, permitting these update requests to continue to fill the sidefile.

25. A digital data storage subsystem, comprising:

a backup data storage subsystem;

a primary data storage subsystem, comprising:

an update buffer;

a data storage of multiple subparts, a controller programmed to receive update requests from at least one host for duplication at the secondary storage subsystem, each update request including update data and designation of a corresponding target primary storage subpart;
an update activity indicator maintaining a representation of update activity of each subpart;
a data mover interconnected between the primary and backup subsystems, programmed to remotely manage updates received at the primary storage subsystem, the operations comprising:
communicating with the controller to obtain reports of update activity;
repeatedly evaluating whether update activity for any subpart has exceeded a prescribed threshold; and
communicating with the controller to obtain notification of update requests received by the controller, and for each received update request,
if the update activity indicator for the update request's target subpart has exceeded the threshold, selectively instructing the controller to reject the update; and
if the update activity indicator for the update request's designated subpart has not exceeded the threshold, instructing the controller to store the update data in the update buffer;
selectively copying update data from the update buffer to the backup subsystem.

26. A digital data storage subsystem, comprising:
a backup subsystem;
a primary subsystem including data storage containing multiple data items;
a data mover interconnected between the primary and backup subsystems, programmed to mirror data storage of the primary subsystem at the backup subsystem, and to perform operations to manage updates submitted by host applications for storage by the primary subsystem, the operations comprising:
receiving update requests, each update request including update data and identification of an associated data item in the data storage to be updated by the update data;
each received update request, consulting an update record to determine whether past update activity of the associated data item exceeds a prescribed level, and
if not, storing the update in an update buffer and advancing the update record;
if so, consulting a rejection record to determine whether past rejection of updates to the associated data item exceeds a predetermined level, and
if so, storing the update in the update buffer and advancing the update record;
if not, rejecting the update and advancing the rejection record.

27. A digital data storage system, comprising:
a backup data storage subsystem including backup storage devices;
a primary data storage subsystem, comprising:
a sidefile;
primary storage devices corresponding to the backup storage devices;
a controller, programmed to receive update requests from one or more hosts, each update request including update data and specification of one of the primary storage devices,
a data mover interconnected between the primary and backup subsystems, programmed to remotely manage updates received at the primary storage subsystem, the operations comprising:
tracking update activity at the primary storage subsystem according to specified primary storage device;
performing fairness-driven update regulation, comprising:
for update requests specifying primary storage devices with a prescribed level of update activity, instructing the controller to prevent storage of the associated update data in the sidefile; and
for update requests specifying primary storage devices with less than the prescribed level of update activity, instructing the controller to store the associated update data in the sidefile.

28. A method of managing update activity in a data storage system that includes a primary subsystem and a secondary subsystem, the primary and secondary subsystems including respective primary and secondary storage, each storage including multiple data objects, where the system includes a module that receives update requests from one or more hosts, each update request including update data and specification of a corresponding one of the primary storage data objects, the module responsive to each update request to initially buffer the update data and thereafter copy the buffered update data to the primary and secondary storage in association with the specified data object, the method comprising the operations of:
tracking update activity according to specified primary storage data object;
performing fairness-driven update regulation, comprising:
for each update request specifying a primary storage data object demonstrating historical update activity exceeding a prescribed threshold, preventing buffering of update data of said update request; and
for each update request specifying a primary storage data object whose historical update activity does not exceed the prescribed threshold, permitting buffering of update data of said update request.

29. A signal-bearing medium tangibly embodying a program of machine-readable instructions executable by a digital processing apparatus to perform operations of managing update activity in a data storage system that includes a primary subsystem and a secondary subsystem, the primary and secondary subsystems including respective primary and secondary storage, each storage including multiple data objects, where the system includes a module that receives update requests from one or more hosts, each update request including update data and specification of a corresponding one of the primary storage data objects, the module responsive to each update request to initially buffer the update data and thereafter copy the buffered update data to the primary and secondary storage in association with the specified data object, the method comprising the operations of:
tracking update activity according to specified primary storage data object;
performing fairness-driven update regulation, comprising:
for each update request specifying a primary storage data object demonstrating historical update activity exceeding a prescribed threshold, preventing buffering of update data of said update request; and
for each update request specifying a primary storage data object whose historical update activity does not exceed the prescribed threshold, permitting buffering of update data of said update request.

30. A logic circuit of multiple interconnected electrically conductive elements configured to perform operations for managing update activity in a data storage system that includes a primary subsystem and a secondary subsystem, the primary and secondary subsystems including respective primary and secondary storage, each storage including multiple data objects, where the system includes a module that receives update requests from one or more hosts, each update request including update data and specification of a corresponding one of the primary storage data objects, the module responsive to each update request to initially buffer the update data and thereafter copy the buffered update data to the primary and secondary storage in association with the specified data object, the method comprising the operations of:

tracking update activity according to specified primary storage data object;

performing fairness-driven update regulation, comprising:

each update request specifying a primary storage data object demonstrating historical update activity exceeding a prescribed threshold, preventing buffering of update data of said update request; and for each update request specifying a primary storage data object whose historical update activity does not exceed the prescribed threshold, permitting buffering of update data of said update request.

31. A digital data storage system, comprising:

a primary subsystem and a secondary subsystem, the primary and secondary subsystems including respective primary and secondary storage, each storage including multiple data objects;

a module configured to receive update requests from one or more hosts, each update request including update data and specification of a corresponding one of the primary storage data objects, the module responsive to each update request to initially buffer the update data and thereafter copy the buffered update data to the primary and secondary storage in association with the specified data object, the module also configured to manage update activity in the data storage system by performing operations comprising:

tracking update activity according to specified primary storage data object;

performing fairness-driven update regulation, comprising:

for each update request specifying a primary storage data object demonstrating historical update activity exceeding a prescribed threshold, preventing buffering of update data of said update request; and for each update request specifying a primary storage data object whose historical update activity does not exceed the prescribed threshold, permitting buffering of update data of said update request.

32. A digital data storage system, comprising:

a primary subsystem and a secondary subsystem, the primary and secondary subsystems including respective primary and secondary storage, each storage including multiple data objects;

a module configured to receive update requests from one or more hosts, each update request including update data and specification of a corresponding one of the primary storage data objects, the module responsive to each update request to initially buffer the update data and thereafter copy the buffered update data to the primary and secondary storage in association with the specified data object, the module further including means for managing update activity in the data storage system by:

tracking update activity according to specified primary storage data object;

performing fairness-driven update regulation, comprising:

for each update request specifying a primary storage data object demonstrating historical update activity exceeding a prescribed threshold, preventing buffering of update data of said update request; and for each update request specifying a primary storage data object whose historical update activity does not exceed the prescribed threshold, permitting buffering of update data of said update request.

* * * * *

UNITED STATES PATENT AND TRADEMARK OFFICE
CERTIFICATE OF CORRECTION

PATENT NO.    : 6,487,645 B1
DATED         : November 26, 2002
INVENTOR(S)   : Brian Dow Clark et al.

It is certified that error appears in the above-identified patent and that said Letters Patent is hereby corrected as shown below:

Column 15,
Line 40, insert -- for -- before "each received update".

Column 17,
Line 18, insert -- for -- before "each update request".

Signed and Sealed this

Twenty-fifth Day of March, 2003

JAMES E. ROGAN
*Director of the United States Patent and Trademark Office*